3,056,675
BENZOYL ACETANILIDE COUPLERS
Walter F. Hoffstadt, Vestal, N.Y., assignor to General Aniline & Film Corporation, New York, N.Y., a corporation of Delaware
No Drawing. Filed Aug. 30, 1961, Ser. No. 134,844
4 Claims. (Cl. 96—55)

This invention relates to color photography and to compounds which form dyes on coupling with a developing agent to produce colored images. In particular, the invention relates to coupler compounds for forming yellow dye images in color photography.

It is known to produce colored photographic images by reaching a color-forming or coupling component with the oxidation products of a primary aromatic amino developing agent. In processes of this type, the subtractive method of color formation is ordinarily employed with the result that the photographic images so obtained are composed of the subtractive primary colors, i.e., cyan, magenta and yellow. It is common practice to use phenols or naphthols for the production of cyan images; those producing the magenta dyes are ordinarily pyrazolones whereas open chain reactive ketomethylene compounds serve as the source of the yellow dye images. The present invention is concerned with couplers of the latter type.

One of the basic difficulties confronting color photography concerns the stability of the dyes making up the colored photographic images, i.e., the ability of a photographic dye image to hold up under varying conditions of light, heat and humidity. Although color photography has undergone much improvement since the appearance of Rudolf Fischer's original patent on the use of coupler compounds for the formation of colored photographic images, greater dye stability is still needed and sought after.

It is, therefore, an object of the present invention to provide novel photographic coupler compounds capable of producing yellow dye images on color development with the development product of a primary aromatic amino developing agent.

A further object is to provide coupler compounds which produce yellow dyes having a high degree of heat and light stability.

A still further object is to provide coupler compounds which produce dyes having a high degree of resistance under conditions of high humidity.

Other objects will appear as the description proceeds.

The aforesaid objects are accomplished according to my invention by the use of certain benzoyl acetanilide compounds characterized by a halogen substituent located in the ortho position of the benzoyl group of the coupler molecule.

Couplers of this type are depicted in the following general formula:

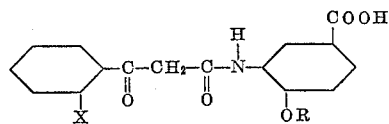

wherein X represents halogen and R represents an alkyl group of at least 10 carbon atoms, e.g., decyl, undecyl, dodecyl, tridecyl, tetradecyl, pentadecyl, hexadecyl, heptadecyl, octadecyl, nonadecyl, etc.

Specific compounds which I may use are exemplified below:

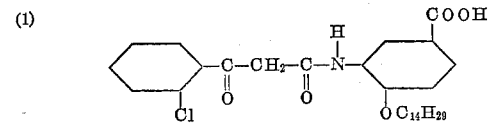

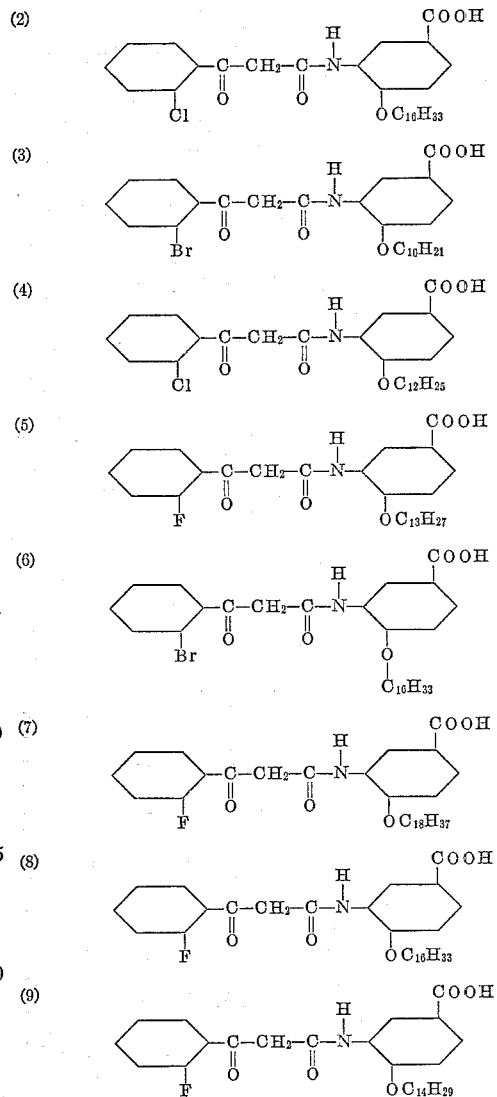

In general, the couplers are produced by condensing an orthohalo benzoylacetic ester and a 3-amino-4-alkoxy benzoic acid of at least 10 carbon atoms in the presence of an aromatic hydrocarbon solvent. The ethyl alcohol which was formed during the condensation is removed by distillation. The preparation of the ethyl o-chlorobenzoyl acetate is described in the chemical literature and in this connection reference is made to J.A.C.S., 37, 1259. The method disclosed in the reference comprises reacting an o-halobenzoyl halide with ethyl acetoacetate in the presence of sodium ethoxide followed by hydrolysis with ammonium chloride and ammonium hydroxide. The o-benzoylacetic ester is purified by distillation under vacuum.

The 3-amino-4-alkoxy benzoic acid is prepared by the following sequence of reactions; p-hydroxy benzoic acid is treated with nitric acid in order to obtain 3-nitro-4-hydroxy benzoic acid as disclosed in Berichte, 20, 408, and Berichte, 29, 1756. The nitro compound is then reduced using tin and hydrochloric acid according to a procedure given in J.A.C.S., 51, 507. The amine is next acetylated with acetic anhydride and the resulting 3-acetamido-4-hydroxy benzoic acid alkylated with an alkyl halide of at least 10 carbon atoms in order to produce the corresponding long chain alkoxy acetyl amino benzoic acid. The acetyl group is then removed by treatment with an aqueous alcoholic alkali solution.

The following examples are illustrative of the preparation and use of the couplers described herein, but such examples are not to be taken as limiting the invention.

PREPARATION OF INTERMEDIATES

(A) Preparation of Ethyl 2-Chlorobenzoylacetate

The preparation of the intermediate ethyl 2-chlorobenzoylacetate is described in J.A.C.S., 37, 1259. In general, the method comprises reacting o-chlorobenzoyl chloride with an acetoacetic ester in the presence of sodium ethoxide at a temperature of about 5° C. to 10° C. The resulting o-chlorobenzoyl-aceto-acetic ester is then hydrolyzed at a temperature between 40–50° C. with an aqueous solution containing a mixture of ammonium hydroxide and ammonium chloride in order to obtain the aforesaid ethyl 2-chlorobenzoyl acetate.

(B) Preparation of Ethyl 2-Fluorobenzoylacetate

In accordance with the method described in J.A.C.S., 99, 1062–3, o-fluorotoluene was oxidized with potassium permanganate to form the fluorobenzoic acid (M.P. 126–127°) which was then converted into the fluorobenzoyl chloride (B.P. 99° C./13 mm.). The preparation of the ethyl 2-fluorobenzoyl acetate (B.P. 124–125° C./1.5 mm.) was analogous to the corresponding chloro derivative.

(C) Preparation of 3-Amino-4-Tetradecoxybenzoic Acid

The 3-amino-4-tetradecoxybenzoic acid intermediate was prepared in the following series of syntheses starting with 3-amino-4-hydroxybenzoic acid, the preparation of which is described in J.A.C.S., 51, 507.

3-amino-4-hydroxybenzoic acid hydrochloride was acetylated with an excess of acetic anhydride in aqueous solution at a temperature ranging from 30–35° C. The acetylation proceeded quite rapidly and was essentially complete after addition of the acetic anhydride. The white solid 3-acetamido-4-hydroxybenzoic acid was filtered off and washed with water. The yield was 62 grams.

750 mls. of absolute alcohol were placed in a 2-liter, 3-neck flask fitted with a stirrer and reflux condenser. 14.5 grams of sodium metal was then added in small pieces while maintaining efficient stirring. The addition of the sodium metal was regulated so as to prevent vigorous refluxing of the alcohol solvent. To the resulting sodium ethylate solution there was added 62 grams of acetamido-4-hydroxybenzoic acid, prepared as described above, and the mixture heated in order to effect complete solution. To this solution there was added 97 grams of n-tetradecyl bromide and the reaction mixture was further heated for 5 hours. The solution was then poured into 2-liters of ice and water and acidified with concentrated hydrochloric acid. The solid which had precipitated was filtered off and washed with water. The slightly damp cake was recrystallized from about 1.5 liters of ethyl alcohol to which had been added a small amount of charcoal. The yield of purified 3-acetylamino-4-tetradecoxybenzoic acid, which melted at 188–189° C., 63 grams.

The 3-amino-4-tetradecoxybenzoic acid was obtained by heating under reflux for 5 hours, 63 grams of 3-acetyl-amino-4-tetradecoxybenzoic acid together with 300 milliliters of 6 N sodium hydroxide solution and 150 milliliters of ethanol. The clear solution was poured into 1-liter of cold water and acidified with concentrated hydrochloric acid. The resulting solid was purified and recrystallized from acetic acid. 50 grams of a white product having a melting point of 98–99° C. was obtained.

EXAMPLE I

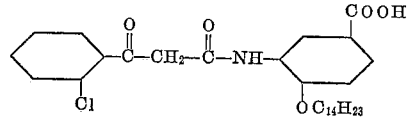

Into a 1-liter, 3-necked flask, equipped with stirrer, dropping funnel and an upright steam heated condenser topped with a Claisen head and thermometer, was placed 50.0 grams (0.14 mole) of 3-amino-4-tetradecoxybenzoic acid and 500 ml. of xylene. About 100 mls. of the solvent was then distilled through the apparatus, with the steam shut off, to remove any moisture. Steam was then passed through the condenser and 34.0 grams (0.15 mole) of ethyl 2-chlorobenzoylacetate was added by a rapid dropwise addition with agitation. The mixture was then stirred under reflux for 2 hours. (The temperature in the Claisen head dropped, indicating that the elimination of alcohol was completed.) The hot reaction mixture was then transferred to a beaker and allowed to cool and crystallize. After chilling in ice, the solids were collected by filtration and washed with several 50 ml. portions of cold, low boiling (30–60° C.) petroleum ether. When dry, the filter cake was recrystallized by dissolving it in about 1-liter of hot acetic acid, treating with Norit® type charcoal and filtering. After chilling the filtrate and collecting the solids, they were washed with low boiling petroleum ether and dried. The yield of white product was 41.5 grams (56%) with a melting point of 169–170° C.

*Analysis.*—Calc.: C, 67.9%; H, 7.8%; N, 2.6%; Cl, 6.7%. Found: C, 68.2%; H, 7.9%; N, 2.8%; Cl, 7.2%.

One gram of this yellow color former was dispersed in 20 mls. of water and rendered soluble by adjusting the pH of this dispersion to a value of 7.5 by means of a saturated lithium hydroxide solution. The dissolved color former was then added to a silver bromide gelatin emulsion, which was then coated on a subbed cellulose acetate base. The so obtained photographic coating was then exposed through a pattern and developed in a color developer containing, as the active principle, a primary aromatic amino developing agent of the type known in the art. Suitable developing agents include the various alkyl phenylenediamines such as 4-dimethylaminoaniline, 4 - diethylaminoaniline, 4-[N-(β-hydroxyethyl)-N-ethyl] aminoaniline, 4 - amino - N - ethyl-N-(β-methanesulfon-amidoethyl)-2-methylaniline sulfate and the like. The above developing agents are preferably used in the form of their salts such as the hydrochloride or sulfate as they are more soluble and stable than the free bases. All of these compounds have a primary amino group which enables the oxidation product of the developer to couple with the color compounds to form dye images. After removal of the silver image by bleaching and fixing in a manner well-known to the art, the color image remains in the emulsion. A suitable developing solution can be prepared as follows:

| | Grams |
|---|---|
| 2-amino-5-diethylaminotoluene | 2 |
| Sodium carbonate (anhydrous) | 20 |
| Sodium sulfite (anhydrous) | 2 |
| Potassium bromide | 0.2 |
| Water to make 1 liter. | |

The exposed silver halide emulsions containing the color formers, when developed in the above solution in the usual manner, yielded a yellow dye having an absorption maximum at 440 millimicrons which was extremely stable against light fading and completely resistant against high humidity fading.

EXAMPLE II

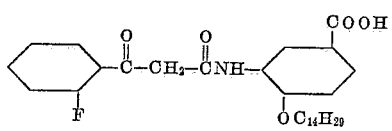

This compound was prepared from ethyl fluorobenzoylacetate and 3-amino-4-tetradecoxybenzoic acid in accordance with the procedure described in Example I. The yellow dye image formed upon color development had an absorption maximum at 428 millimicrons, excellent stability against light fading and did not show any high humidity fading.

My couplers may be incorporated in gelatin silver halide layers or in silver halide emulsions using other carriers such as water permeable organic acid esters of cellulose or synthetic polymers such as polyvinyl alcohol. Typical supports are exemplified by glass, cellulose esters, polyterephthalic acid esters, polycarbonates or non-transparent reflecting media such as paper or an opaque cellulose ester. The emulsions containing my color formers may be in the form of a single layer on a support or of a separate layer which may be coated on one or both sides of the support. In the case of a multilayer photographic element, various layers may be differentially sensitized to various regions of the visible spectrum in a known manner.

This application is a continuation-in-part of my copending application, Serial No. 840,546, filed September 17, 1959, now abandoned.

I claim:

1. A light-sensitive silver halide emulsion containing a color former of the following formula:

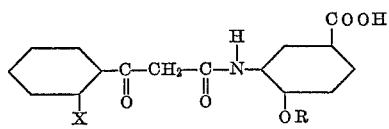

wherein R is an alkyl radical containing at least 10 carbon atoms and X is a halogen atom selected from the class consisting of fluorine, chlorine and bromine.

2. The composition as defined in claim 1 wherein the color former is represented by the following structure:

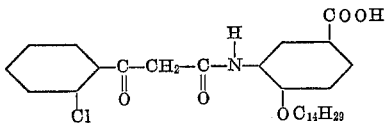

3. The process of producing a yellow dyestuff image in a silver halide emulsion containing a color former for yellow having the following formula:

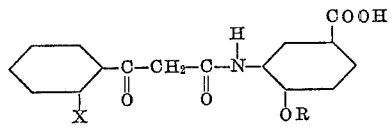

wherein R is an alkyl radical containing at least 10 carbon atoms and X represents a halogen atom selected from the class consisting of fluorine, chlorine and bromine, which comprises exposing said emulsion to light and developing the same with a primary aromatic amino developer, thereby reacting the color former with the oxidation products of the primary amino developer so as to form a yellow dyestuff image.

4. The process as defined in claim 3 wherein the color former is represented by the following formula:

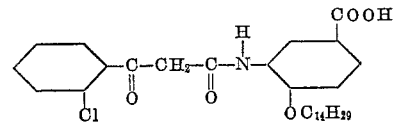

No references cited.